(12) United States Patent
Jeong et al.

(10) Patent No.: US 8,983,942 B2
(45) Date of Patent: Mar. 17, 2015

(54) METHOD AND APPARATUS FOR PROVIDING TIME MACHINE SERVICE BASED ON SOCIAL NETWORK SERVICE

(75) Inventors: Young Ho Jeong, Daejeon (KR); Jin Woo Hong, Daejeon (KR); Chung Hyun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 195 days.

(21) Appl. No.: 13/411,332

(22) Filed: Mar. 2, 2012

(65) Prior Publication Data
US 2012/0254307 A1  Oct. 4, 2012

(30) Foreign Application Priority Data
Apr. 1, 2011 (KR) .................. 10-2011-0030299

(51) Int. Cl.
  G06F 17/00 (2006.01)
  G06Q 50/00 (2012.01)
  G06F 17/30 (2006.01)

(52) U.S. Cl.
  CPC .......... *G06Q 50/01* (2013.01); *G06F 17/30044* (2013.01); *G06F 17/30864* (2013.01); *G06F 17/30064* (2013.01); *G06F 17/3082* (2013.01); *G06F 17/30867* (2013.01)
  USPC ........... 707/725; 707/723; 707/728; 707/746; 707/751

(58) Field of Classification Search
  CPC ..... H04N 21/232; G06F 17/30; G06F 17/301; G06F 17/30103; G06F 17/30106; G06F 17/30112; G06F 17/30861; G06F 17/30044; G06F 17/30064; G06F 17/30864; G06F 17/30867; G06F 17/3082
  USPC ......... 709/204, 217, 218, 219; 705/14.54, 35; 707/737, 754, 760, 741, 780, 100, 725, 707/723, 728, 746, 751; 725/46, 9; 455/414.1; 726/1; 715/202; 713/153
  See application file for complete search history.

(56) References Cited

U.S. PATENT DOCUMENTS

| | | | |
|---|---|---|---|
| 2002/0188841 A1* | 12/2002 | Jones et al. | 713/153 |
| 2007/0203816 A1* | 8/2007 | Costache et al. | 705/35 |
| 2008/0183697 A1* | 7/2008 | Narahara et al. | 707/760 |
| 2008/0207182 A1* | 8/2008 | Maharajh et al. | 455/414.1 |
| 2008/0209010 A1* | 8/2008 | Zitnick, III et al. | 709/219 |
| 2008/0294607 A1 | 11/2008 | Partovi et al. | |
| 2008/0294663 A1* | 11/2008 | Heinley et al. | 707/100 |
| 2009/0177745 A1* | 7/2009 | Davis et al. | 709/204 |
| 2010/0010789 A1 | 1/2010 | Hazard | |
| 2010/0100550 A1* | 4/2010 | Kitayama | 707/741 |

(Continued)

FOREIGN PATENT DOCUMENTS

| | | |
|---|---|---|
| JP | 2009099088 A | 5/2009 |
| KR | 1020090052970 A | 5/2009 |

*Primary Examiner* — Le H Luu
(74) *Attorney, Agent, or Firm* — H.C. Park & Associates, PLC

(57) ABSTRACT

Disclosed are a method for providing a time machine service based on an SNS (social network service), including: extracting keywords based on SNS information input by SNS users and collecting rich contents relating to the SNS information based on the keywords; dividing points of past, present, and future, based on a predetermined present time period and classifying the rich contents into any one of past information, present information, and future information, based on the division result; and providing the classified rich contents to the SNS users.

20 Claims, 4 Drawing Sheets

(56) References Cited

U.S. PATENT DOCUMENTS

| | | | |
|---|---|---|---|
| 2010/0262986 A1* | 10/2010 | Adimatyam et al. | 725/9 |
| 2011/0030031 A1* | 2/2011 | Lussier et al. | 726/1 |
| 2011/0040657 A1* | 2/2011 | Roswell | 705/27.1 |
| 2011/0173214 A1* | 7/2011 | Karim | 707/754 |
| 2011/0320495 A1* | 12/2011 | Levy-Yurista et al. | 707/780 |
| 2012/0030711 A1* | 2/2012 | Rae et al. | 725/46 |
| 2012/0191709 A1* | 7/2012 | Morrison et al. | 707/737 |
| 2012/0210200 A1* | 8/2012 | Berger et al. | 715/202 |
| 2012/0316962 A1* | 12/2012 | Rathod | 705/14.54 |

* cited by examiner

METHOD AND APPARATUS FOR PROVIDING TIME MACHINE SERVICE BASED ON SOCIAL NETWORK SERVICE

CROSS-REFERENCE TO RELATED APPLICATIONS

This application claims priority to and the benefit of Korean Patent Application No. 10-2011-0030299 filed in the Korean Intellectual Property Office on Apr. 1, 2011, the entire contents of which are incorporated herein by reference.

TECHNICAL FIELD

The present invention relates to a method and an apparatus for providing a time machine service based on a social network service (SNS) that are capable of classifying high value added information searched based on information provided by an SNS user at points of past, present, and future to provide to social network members.

BACKGROUND ART

Recently, as a social network service (SNS) such as Twitter or Facebook or a mobile terminal such as a smart phone are widely used, various multimedia information can be commonly shared or consumed at anytime and anywhere. This phenomenon is being accelerated in accordance with the appearance of smart phones (I-phone or Android phone), smart pads (I-pad or Galaxy tab), smart TVs (Google TV or Apple TV), or MID (mobile Internet device).

People sends information regarding one's daily life or an opinion regarding a specific issue to SNS members through a social network service (Twitter, Facebook, or Flickr) using a terminal such as a smart phone at anytime and anywhere, thereby sharing useful information each other. The type of information sent through the SNS can be any one of a photo, a voice message, a video, and a short text message.

However, the shared information is configured only by fragmentary present information and past information provided by the individual members while high value added information such as a high quality picture image, high quality video information, expert evaluation information, event information, or prediction information relating to the corresponding shared information is not provided. Therefore, it may be inconvenient for the other members who use the SNS to search information in order to obtain high value added information relating the information that is fragmentarily provided or the quality of the collected information may not be guaranteed.

In order to solve the problems caused by the limitation of the information that is shared in the SNS described above, it is required to efficiently collect high value added information regarding the points of past, present, and future, associated with the shared SNS information and provide the information.

SUMMARY OF THE INVENTION

The present invention has been made in an effort to provide a more improved function, that is, classify high value added information searched based on the information provided by SNS users at past, present, and future to provide the information to SNS members.

Further, the present invention has been made in an effort to provide a new business field that connects the broadcasting and communication by converging broadcasting service provider possessing various contents and SNS companies.

An exemplary embodiment of the present invention provides a method for providing a time machine service based on an SNS (social network service), including: extracting keywords based on SNS information input by SNS users and collecting rich contents relating to the SNS information based on the keywords; dividing points of past, present, and future based on a predetermined present time period and classifying the rich contents into any one of past information, present information, and future information, based on the division result; and providing the rich contents classified according to the information to the SNS users.

The method may further include: linking the SNS information to the rich contents.

The method may further include: parsing the received SNS information to extract keywords.

The parsing of the SNS information extracts keywords included in a sentence in case of text contents, keywords by using metadata or image processing in case of photos or videos, and keywords through voice recognition in case of audios.

The method may further include: judging whether the SNS information is linked to the rich contents.

The classifying of the rich contents includes: setting a present time period to classify the rich contents as present information; dividing points of past, present, and future, based on the present time period; analyzing the rich contents; and classifying past information, present information, and future information, based on the analyzed rich contents.

The present time period may be divided into points of past, present, and future, based on a point of time when the operation of classifying rich contents begins.

The method may further include: storing the rich contents.

The method may further include: classifying the rich contents that are transmitted in real time, into the points of the present, the past, and the future.

The method may further include: generating SNS information using an SNS application program installed in a mobile terminal or an SNS message board.

Another exemplary embodiment of the present invention provides an apparatus for providing a time machine service based on an SNS (social network service), including: a rich contents collecting unit configured to extract keywords based on SNS information input by SNS users and collect rich contents relating to the SNS information based on the keywords; a time machine processing unit configured to divide points of past, present, and future, based on a predetermined present time period and classify the rich contents into any one of past information, present information, and future information, based on the division result; and an SNS linked rich contents transmitting unit configured to provide the rich contents classified according to the information to the SNS users.

The apparatus may further include: a rich contents linking unit configured to link the SNS information to the classified rich contents so as to provide the classified rich contents to the SNS users.

The rich contents linking unit may link the rich contents to the SNS information using link information that is accessible to the rich contents.

The rich contents collecting unit may include: an SNS information parsing unit configured to parse the SNS information to extract keywords.

The SNS information parsing unit may extract keywords included in a sentence in case of text contents, keywords by using metadata or image processing in case of photos or videos, and keywords through voice recognition in case of audios.

The apparatus may further include: a rich contents DB configured to store the rich contents.

The time machine processing unit may classify the rich contents positioned in the present time period as present information, contents associated with the time zone earlier than the present time period as future information, and contents older than the present time period as past information.

The time machine processing unit may classify the rich contents that are transmitted in real time into the points of present, past, and future, using the keywords.

The apparatus may further include: an SNS information receiving unit configured to receive SNS information.

The rich contents collecting unit may collect rich contents that are generated in real time by SNS users.

According to exemplary embodiments of the present invention, it is possible to improve the quality of collected information by classifying high value added information searched based on information provided by SNS users into past, present, and future to provide the information to SNS members.

Further, according to exemplary embodiments of the present invention, it is possible to efficiently provide high value added information by providing a new business field that connects the broadcasting and communication by converging the broadcasting service provider possessing various contents and SNS companies.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
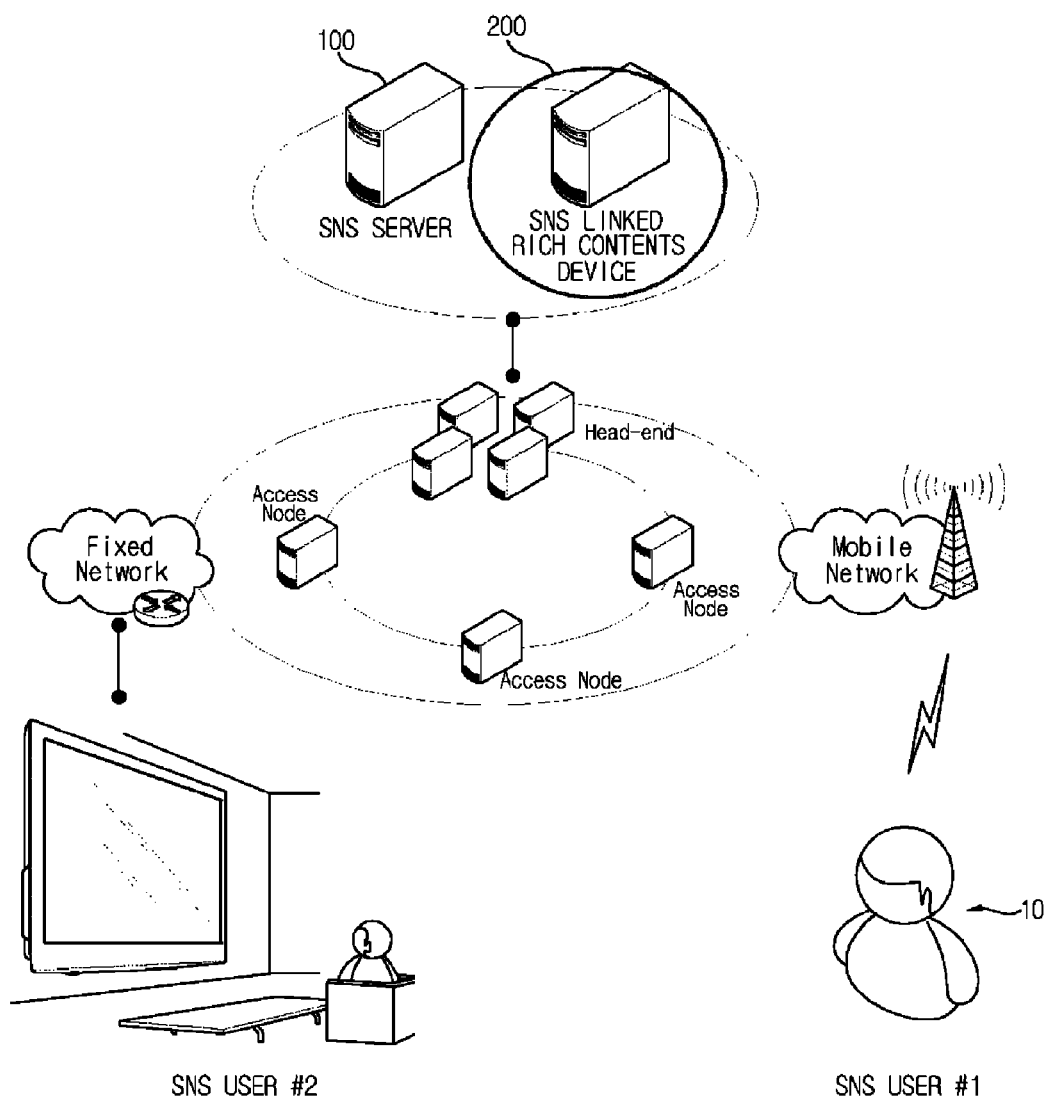
FIG. 1 is a diagram illustrating an entire system for providing an SNS based time machine service according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention may be implemented by various means. For example, the exemplary embodiments of the present invention may be implemented firmware, software, or a combination thereof, or the like.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various units.

Specific terms are provided to help understandings of the present invention. The use of the specific terms may be changed into other forms without departing from the technical idea of the present invention.

Hereinafter, exemplary embodiments of the present invention will be described in detail with reference to the accompanying drawings.

FIG. 1 is a diagram illustrating an entire system for providing an SNS based time machine service according to an exemplary embodiment of the present invention.

Figure 2:
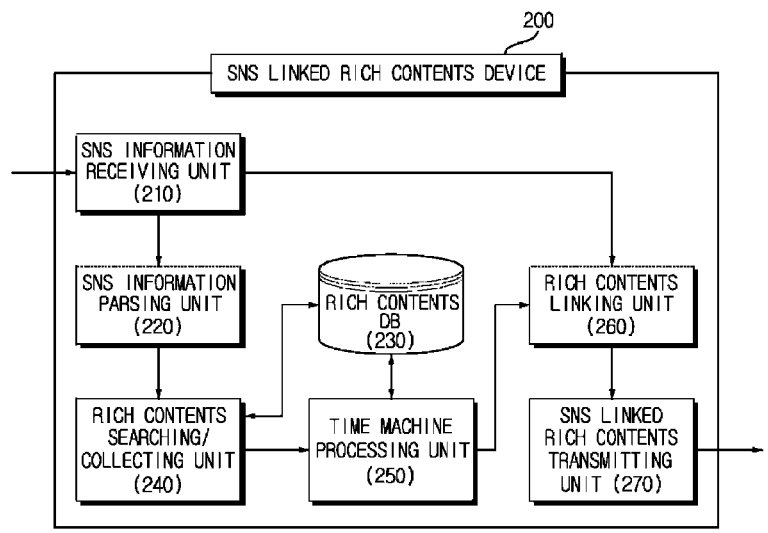
FIG. 2 is a block diagram illustrating an SNS based time machine service providing apparatus according to an exemplary embodiment of the present invention.

FIG. 2 is a block diagram illustrating an SNS based time machine service providing apparatus according to an exemplary embodiment of the present invention.

Figure 3:
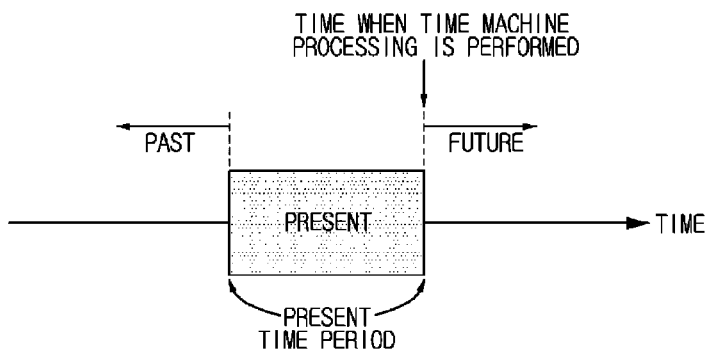
FIG. 3 is a diagram illustrating a time machine processing according to an exemplary embodiment of the present invention.

FIG. 3 is a diagram illustrating a time machine processing according to an exemplary embodiment of the present invention.

Hereinafter, an exemplary embodiment will be described with reference to FIGS. 1 to 3.

The entire system for providing an SNS based time machine service suggested by the exemplary embodiment classifies high value added information (rich contents) such as a related high quality picture image, high quality video information, expert evaluation information, event information, or prediction information at points of past, present, and future to provide services linking to the SNS information in order to overcome limitation of fragmentary SNS information provided through a known broadcasting and communication network.

As shown in FIG. 1, SNS users who stay at home or are moving send information obtained from everyday life or their own opinions to an SNS server 100 through a broadcasting and communication network so as to share information at anytime and anywhere. Specifically, an SNS user #2 who is hiking may take a picture of scenery of a mountain using his/her mobile terminal and send the picture information to an SNS member #1 who is a member of the same group.

Based on the information of the SNS members, new high value added information relating to the above information is linked each other through an SNS based time machine service providing device 200 to be provided to SNS users.

In the exemplary embodiment, even though the SNS server 100 and the SNS based time machine service providing device 200 are separately set, the exemplary embodiment is not limited thereto, but may be embodied by a single integrated server.

A mobile terminal may send information obtained from one's daily life or an opinion regarding a specific issue to SNS members through a social network service (Twitter, Facebook, or Flickr) using a terminal such as a smart phone at anytime and anywhere. The information may be sent as a multimedia type such as a photo, a voice message, a video, or a short text message.

The mobile terminal may include smart phones (I-phone or Android phone), smart pads (I-pad or Galaxy tab), smart TVs (Google TV or Apple TV), or MID (mobile Internet device).

An SNS linked rich contents device according to an exemplary embodiment of the present invention will be described with reference to FIG. 2.

The SNS based time machine service providing device 200 may include an SNS information receiving unit 210 configured to receive SNS information, an SNS information parsing unit 220 configured to parse the SNS information input by the SNS users to extract keywords, a rich contents DB 230 configured to store the rich contents, a rich contents collecting unit 240 configured to extract the keywords based on the SNS information input by the SNS users and collect rich contents associated with the SNS information based on the keywords, a time machine processing unit 250 configured to divide points of past, present and future based on a predetermined present time period and classify the rich contents into any one of past information, present information, and future information, based on the division result, a rich contents linking unit 260 configured to link the SNS information to the classified rich contents in order to provide the classified rich contents to the SNS users, and a transmitting unit 270 configured to provide the rich contents classified according to the information to the SNS users.

The rich contents collecting unit 240 may extract the keywords based on the SNS information input by the SNS users and searches and search and collect the rich contents associated with the SNS information based on the keywords.

The SNS information may be generated by using an SNS application program installed in the mobile terminal or an SNS message board.

The SNS information may include texts, photos, videos or audios.

Specifically, the SNS user #1 takes a picture of surrounding scenery during a hike. In this case, the captured scenery may be configured by a photo or a video. In addition to the surrounding scenery, various multimedia information such as wild grasses, trees, or his/her impression of the hike may be included.

The rich contents refer to contents information such as videos, audios, metadata, and images. The rich contents are classified at points of past, present, and future by the time machine processing unit 250 as shown in FIG. 3 and the classified information is stored and managed in the rich contents DB 230 so as to process the corresponding search words in real time in the future.

The SNS information receiving unit 210 receives SNS information that is required to be linked to the rich contents from the SNS server 100 so as to transmit the information to the SNS information parsing unit 220 and the rich contents linking unit 260.

If the received SNS information is text contents, the SNS information parsing unit 220 searches a keyword included in a sentence. If the received SNS information is photos or videos, the SNS information parsing unit 220 searches a keyword regarding an important object included in the photos and the videos by using the contained metadata or image processing. Further, if the received SNS information is audios, the SNS information parsing unit 220 searches a keyword through voice recognition.

The rich contents collecting unit 240 uses an analyzed keyword to search and collect related information from the rich contents DB 230. In this case, if the information regarding the keyword is insufficient, the rich contents collecting unit 240 searches the corresponding information in real time to update and utilize the rich contents DB 230.

The time machine processing unit 250 may divide points of the past, the present, and the future, based on the predetermined present time period and classify the rich contents into any one of past information, present information, and future information, based on the division result.

Figure 4:
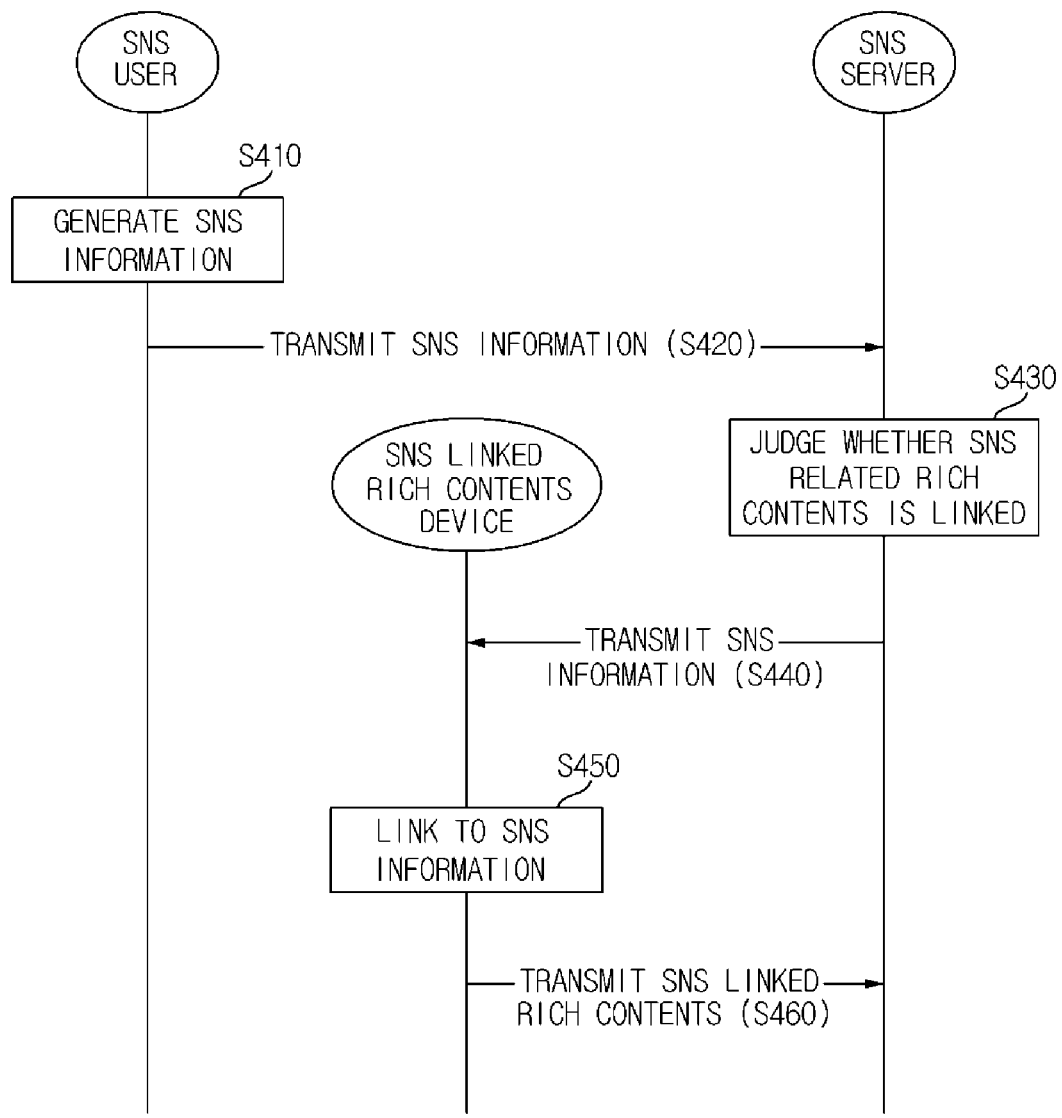
FIG. 4 is a flow chart illustrating an SNS based time machine service providing method according to another exemplary embodiment of the present invention.

The time machine processing unit 250 classifies the collected rich contents at the points of past, present, and future as shown in FIG. 4. The rich contents is stored and managed in the rich contents DB 230 in order to process the corresponding search word in real time in the future.

The time machine processing unit 250 classifies contents positioned in a present time period based on the operating time as present information, contents associated with the time zone earlier than the time machine processing time as future information, and contents older than the present time as past information.

For example, if SNS information that explains the scenery of Himalayas is received, the SNS information parsing unit 220 searches a keyword included in a sentence in case of text contents explaining Himalayas, a keyword regarding an important object included in photos and videos by using the contained metadata or image processing in case of the photos or videos of Himalayas, and a keyword through voice recognition in case of audios explaining the scenery of Himalayas.

Here, the rich contents collecting unit 240 searches and collects the related Himalayas information from the rich contents DB 230 using the analyzed keyword. In this case, if the information on the keyword is insufficient, the rich contents collecting unit 240 searches the information on Himalayas in real time to update and utilize the rich contents DB 230.

The time machine processing unit 250 classifies the collected rich contents relating to Himalayas into past (history, or seasonal scenery), present (current image, or information on neighboring countries), and future (expectation information regarding glacier). The rich contents relating to Himalayas is stored and managed in the rich contents DB 230 to process the corresponding search word in real time in the future.

If SNS information relating to a person is received, the SNS information parsing unit 220 searches a keyword in a sentence in case of text contents explaining a person, a keyword regarding an important object included in photos and videos by using the contained metadata or image processing in case of the photos or videos of the person, and a keyword through voice recognition in case of an audio explaining the person.

The time machine processing unit 250 classifies the collected rich contents relating to the person into past (hometown, schools or past image), present (current residence, job, or phone number) and future (travel schedule or reservation).

The rich contents relating to the person is stored and managed in the rich contents DB 230 to process the corresponding search word in real time in the future.

The time machine processing unit 250 may set a present reference time in order to classify the present, the past, and the future time based on the time when the SNS information is requested.

Specifically, when the user receives SNS information regarding surrounding information while hiking, the time machine processing unit 250 determines the point of time when the SNS information is requested and classifies the contents positioned in a present time period as present information, contents associated with the time zone earlier than the point of time when the SNS information is requested as future information, and contents older than the present time zone as past information.

For example, if the SNS information is requested at 12:00 p.m. and the present time period is set to one hour, the time machine processing unit 250 classifies the surrounding information within one hour as the present information, the surrounding information before 12:00 p.m. as the past information, and the surrounding information after 13:00 as the future information. The rich contents regarding the surroundings is stored and managed in the rich contents DB 230 to process the corresponding search word in real time in the future.

The present time period may be arbitrarily set to various time periods such as 30 minutes, one hour, twelve hours, one day, or a week by the user or the SNS companies.

The rich contents liking unit 260 links classification information transmitted from the time machine processing unit 250 to the original SNS information. In this case, the linked information may include the rich contents as it is or link information that is accessible to the corresponding rich contents as metadata. Finally, the SNS linked rich contents transmitting unit 270 transmits the corresponding information to the SNS server 100.

The link information refers to information that is accessible to the rich contents and may include a URL (uniform resource location) in which the rich contents are located and an ID (identifier) required to search the corresponding rich contents.

FIG. 4 is a flow chart illustrating an SNS based time machine service providing method according to an exemplary embodiment of the present invention.

Hereinafter, the flow of a method of providing a related advertisement relating to the broadcasting advertisement to a user according to the exemplary embodiment of the present invention will be described with reference to FIG. 4.

An SNS user #1 takes a picture of surrounding scenery during a hike. In this case, the captured scenery may be configured by a photo or a video. In addition to the surrounding scenery, various multimedia information such as wild grasses, trees, or his/her impression of the hike may be included.

First, SNS information is generated by using an SNS application program installed in a terminal or an SNS message board (S410).

The SNS information is transmitted to the SNS server 100 (S420) and the SNS server 100 judges whether the rich contents is linked (S430).

Here, the judging of whether the rich contents is linked may be determined depending on whether the SNS user #1 requests or not or by a service policy of the SNS companies.

If the SNS server 100 judges that the linkage is required, the SNS server 100 transmits the SNS information to the SNS based time machine service providing device 200 (S440).

In order to extract search word required for linkage, the SNS based time machine service providing device 200 searches a keyword included in a sentence in case of text contents, a keyword regarding an important object included in photos and videos by using the contained metadata or image processing in case of the photos or videos, and a keyword through voice recognition in case of an audio based on the received SNS information.

The SNS based time machine service providing device 200 searches and collects the related information from the rich contents DB 230 using the analyzed keyword. In this case, if the information on the keyword is insufficient, the SNS based time machine service providing device 200 searches the corresponding information in real time to update and utilize the rich contents DB 230.

The SNS based time machine service providing device 200 classifies the collected rich contents into past information, present information, and future information to link the information with the SNS information (S450).

Here, the SNS based time machine service providing device 200 may divide points of past, present, and future based on a predetermined present time period and classify the rich contents into any one of past information, present information, and future information based on the division result.

The SNS based time machine service providing device 200 may classify contents positioned in a present time period based on the operating time as present information, contents associated with the time zone earlier than the time machine processing time as future information, and contents older than the present time as past information.

Here, the present time period may be arbitrarily set to various time periods such as 30 minutes, one hour, twelve hours, one day, or a week by the user or the SNS companies.

Next, the SNS based time machine service providing device 200 transmits the rich contents linked to the SNS information to the SNS server 100 (S460), and the SNS server 100 transmits the rich contents linked to the SNS information to the members (SNS users #1 to #N).

Figure 5:
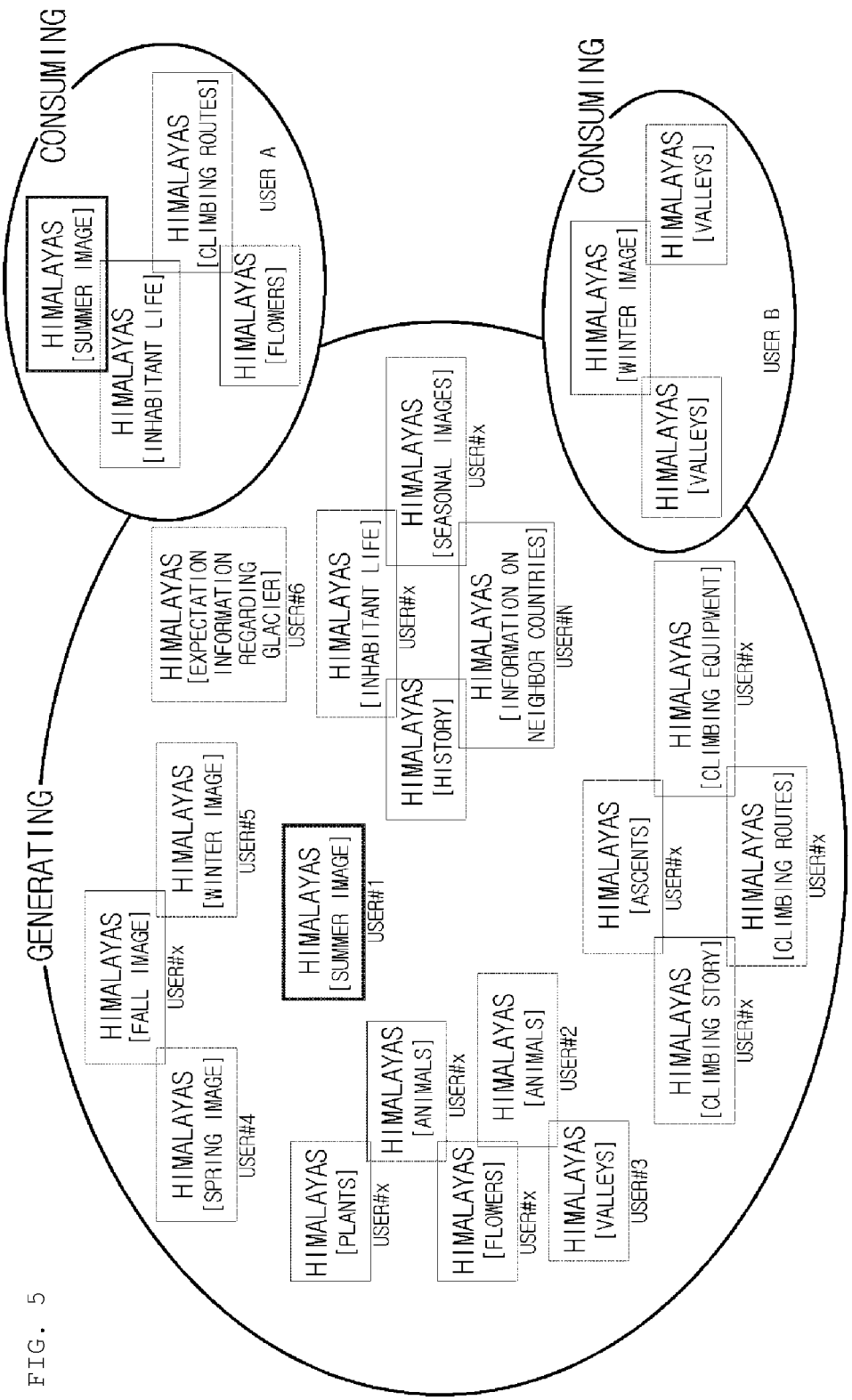
FIG. 5 is a diagram illustrating an SNS linked rich contents generating and using method by SNS members according to an exemplary embodiment of the present invention.

FIG. 5 is a diagram illustrating an SNS linked rich contents generating and using method by SNS members according to an exemplary embodiment of the present invention.

FIG. 5 shows a method that the members generates and consumes information that is requested or provided by the SNS user. With respect to the information requested by the SNS user, the SNS member generates rich contents linked to the SNS information using a mobile terminal.

For example, when an SNS user requests information regarding Himalayas, a user #1, a user #2, and a user #3 additionally generate summer image information of Himalayas, creek information of Himalayas, and valley information of Himalayas, respectively and thus continuously generate rich contents regarding Himalayas.

The generated rich contents may be classified according to the points of past (history or seasonal scenery), present (current image, or information on neighboring countries) and future (expectation information relating to glacier).

The method that the members generate and consume the information requested or generated by the SNS users may continuously improve the quality by adding or updating the information by the SNS members. Further, the beginner in SNS or the other users A and B who participate in generating the rich contents may selectively consume only the required Himalayas related information.

The method according to the exemplary embodiment of the present invention may be implemented by a program and stored in a recording medium (for example, CD-ROM, RAM, ROM, floppy disk, hard disk, or optical magnetic disk) as a computer readable format. Since the person skilled in the art may easily work the above process, the detailed description thereof will be omitted.

The present invention can classify high value added information searched based on information provided by an SNS user at past, present, and future to provide the information to SNS members.

Therefore, the present invention is applicable to an SNS service providing field using a mobile terminal.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for providing a time machine service based on an SNS (social network service), comprising:
    extracting keywords based on SNS information input by SNS users and collecting rich contents relating to the SNS information based on the keywords;
    dividing points of past, present, and future based on a predetermined present time period and classifying the rich contents into any one of past information, present information, and future information, based on the division result; and
    providing the rich contents classified according to the information to the SNS users,
    wherein the extracted keywords are different than the SNS information input by SNS users,
    wherein the dividing point between present and future is a time when the time machine service based on an SNS is performed,
    and wherein collecting rich contents comprises:
        searching and collecting rich contents from a database using the extracted keywords; and
        collecting rich contents from the SNS information input by SNS users.

2. The method of claim 1, further comprising: linking the SNS information to the rich contents.

3. The method of claim 1, further comprising: parsing the received SNS information to extract keywords.

4. The method of claim 3, wherein the parsing of the SNS information includes extracting keywords included in a sentence in case of text contents, extracting keywords by using metadata or image processing in case of photos or videos, and extracting keywords through voice recognition in case of audios.

5. The method of claim 1, further comprising: judging whether the SNS information is linked to the rich contents.

6. The method of claim 1, wherein the classifying of the rich contents includes: setting a present time period to classify the rich contents as present information; dividing points of past, present, and future, based on the present time period; analyzing the rich contents; and classifying past information, present information, and future information, based on the analyzed rich contents.

7. The method of claim 1, wherein the present time period is divided into points of past, present, and future, based on a point of time when the operation of classifying rich contents begins.

8. The method of claim 1, further comprising: storing the rich contents.

9. The method of claim 1, further comprising: classifying the rich contents that are transmitted in real time, into the points of the present, the past, and the future.

10. The method of claim 1, further comprising: generating SNS information using an SNS application program installed in a mobile terminal or an SNS message board.

11. An apparatus for providing a time machine service based on an SNS (social network service), comprising:
    a rich contents collecting unit configured to extract keywords based on SNS information input by SNS users and collect rich contents relating to the SNS information based on the keywords;
    a time machine processing unit configured to divide points of past, present, and future, based on a predetermined present time period and classify the rich contents into any one of past information, present information, and future information, based on the division result; and
    an SNS linked rich contents transmitting unit configured to provide the rich contents classified according to the information to the SNS users,
    wherein the extracted keywords are different than the SNS information input by SNS users,
    wherein the dividing point between present and future is a time when the time machine service based on an SNS is performed,
    and wherein the rich contents collecting unit collects rich contents by:
        searching and collecting rich contents from a database using the extracted keywords; and
        collecting rich contents from the SNS information input by SNS users.

12. The apparatus of claim 11, further comprising: a rich contents linking unit configured to link the SNS information to the classified rich contents so as to provide the classified rich contents to the SNS users.

13. The apparatus of claim 12, wherein the rich contents linking unit links the rich contents to the SNS information using link information that is accessible to the rich contents.

14. The apparatus of claim 11, wherein the rich contents collecting unit includes: an SNS information parsing unit configured to parse the SNS information to extract keywords.

15. The apparatus of claim 14, wherein the SNS information parsing unit extracts keywords included in a sentence in case of text contents, extracts keywords by using metadata or image processing in case of photos or videos, and extracts keywords through voice recognition in case of audios.

16. The apparatus of claim 11, further comprising: a rich contents DB configured to store the rich contents.

17. The apparatus of claim 11, wherein the time machine processing unit classifies the rich contents positioned in the present time period as present information, contents associated with the time zone earlier than the present time period as future information, and contents older than the present time period as past information.

18. The apparatus of claim 11, wherein the time machine processing unit classifies the rich contents that are transmitted in real time into the points of present, past, and future, using the keywords.

19. The apparatus of claim 11, further comprising: an SNS information receiving unit configured to receive SNS information.

20. The apparatus of claim 11, wherein the rich contents collecting unit collects rich contents that are generated in real time by SNS users.

* * * * *